A. B. Shaw,
Treadle.
No. 113,210. Patented Mar. 28, 1871.

Witnesses:
Fred. Antes
W. A. Lewis

Inventor:
Ai B. Shaw
by his attorneys
A. H. & R. K. Evans

UNITED STATES PATENT OFFICE.

AI B. SHAW, OF MEDFORD, MASSACHUSETTS.

IMPROVEMENT IN TREADLES.

Specification forming part of Letters Patent No. 113,210, dated March 28, 1871.

*To all whom it may concern:*

Be it known that I, AI B. SHAW, of Medford, Middlesex county, and State of Massachusetts, have invented an Improvement in Treadles, of which the following is a clear, full, and exact description, reference being had to the accompanying drawing, making a part of this specification, in which—

Figure 1:
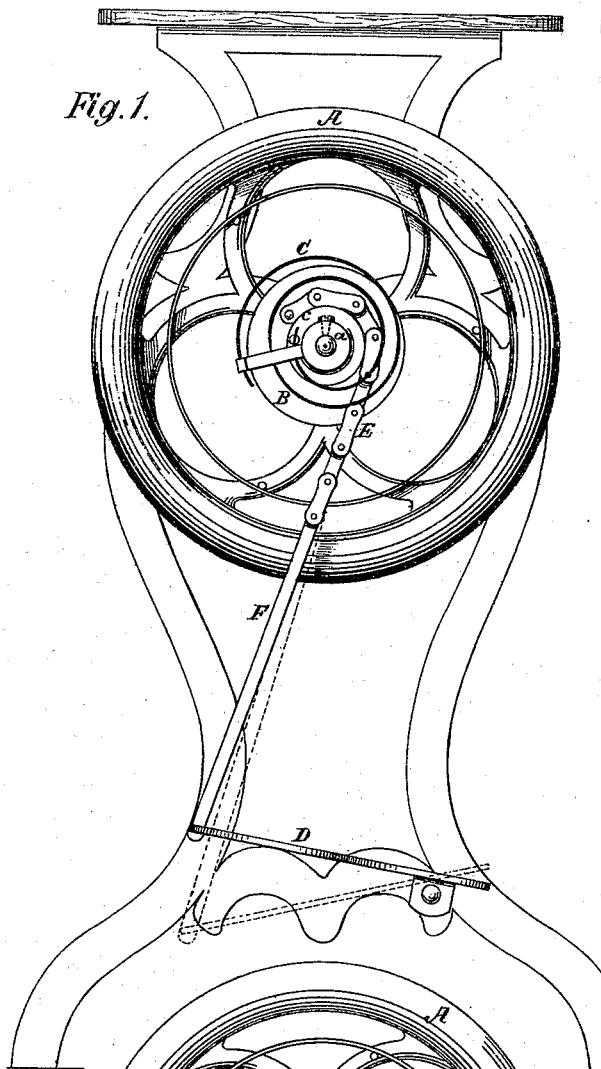
Figure 2:
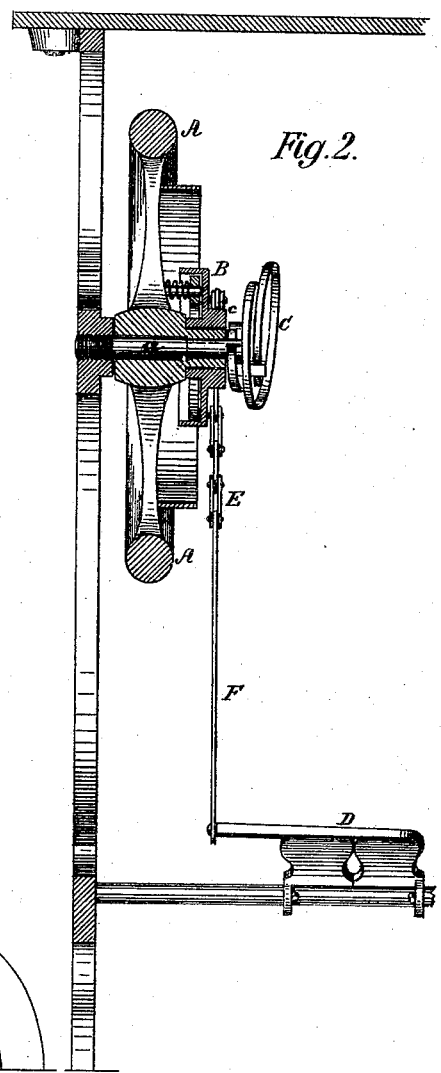
Figure 3:
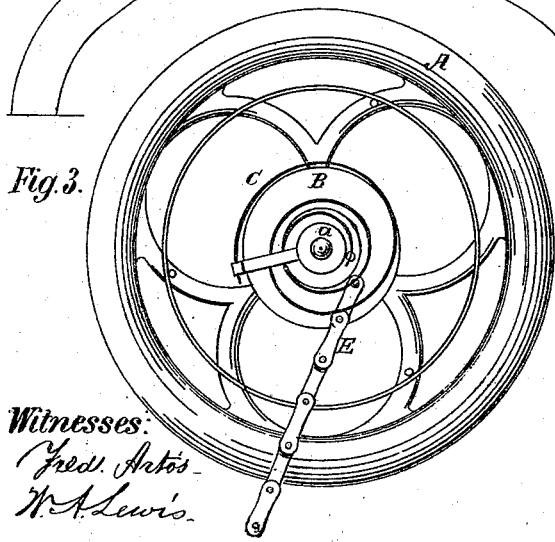
Figure 4:
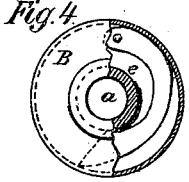
Figure 5:
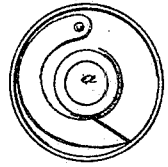

Figure 1 is a vertical section, showing the chain wound up and the foot-plate raised by the spring. Fig. 2 is a cross-vertical section, showing the mechanism in the same position as shown in Fig. 1. Fig. 3 is the same view with Fig. 1, except that the chain is unwound. Figs. 4 and 5 show the opposite sides of the pawl-case, with the pawl in position.

My invention relates to that class of treadles used in sewing and other light machines, lathes, &c.; and consists in the use of a spring and pivoted pawl, in combination with suitable mechanism, as hereinafter described.

To enable others skilled in the art to understand and use my invention, I will proceed to describe the manner in which I have carried it out.

In the annexed drawing, A represents a fly-wheel, turning loosely on the shaft *a*, and having an elongated hub extending partially over the shaft, as shown in Fig. 2, and also at *e* in Fig. 4. On this elongated hub, as an axle, is placed the pawl case or box, B, attached to which is the chain-barrel *c*, as shown in Fig. 2.

C is a spring, with one end attached to a pin on the side of the chain-barrel, and the other secured to a suitable arm fastened to the outer end of the stationary shaft *a*, and wound, as shown in Figs. 1, 2, and 3.

Within the pawl-box B is secured a loosely-pivoted pawl upon a pin extending from the side of the fly-wheel, as shown in Fig. 2. The pawl may be differently pivoted without changing the principle of my invention.

As shown in the annexed drawing, Figs. 4 and 5, the loose end of the pawl drops upon the inner side of the rim of the pawl-box, and, as the box is made to revolve by the unwinding of the chain E, connected with the foot-plate D by the rod F, the friction of the pawl within the box causes the fly-wheel to revolve in the same direction; but when the treadle is released from the pressure of the foot the spring C recoils and carries with it the pawl-case, and rewinds the chain E upon the drum or chain-barrel *c*, while the fly-wheel continues its revolution; and when pressure is again applied to the foot-plate D of the treadle the fly-wheel receives an additional impetus.

Having thus described my invention, what I claim as new, and desire to secure by Letters Patent, is—

The treadle composed of the shaft *a*, fly-wheel A, pawl-case B, and a pivoted pawl, in combination with the spring C, foot-plate D, chain E, and connecting-rod F, all constructed and operated substantially as and for the purpose set forth.

Witness my hand this 7th day of March, A. D. 1871.

AI B. SHAW.

Witnesses:
P. E. TESCHEMACHER,
W. J. CAMBRIDGE.